April 15, 1924.
C. F. A. BELLAMY
GARDEN TOOL
Filed Dec. 18, 1922
1,490,582
Fig.1
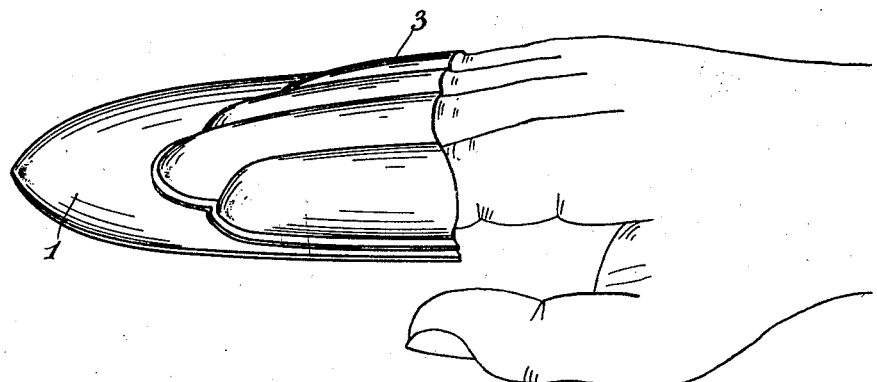
Fig.2
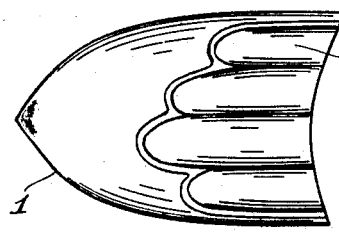
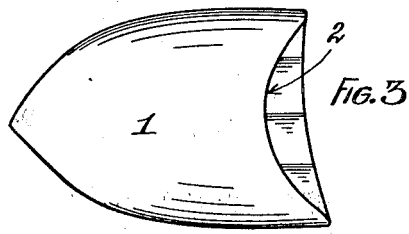
Fig.3
Fig.4
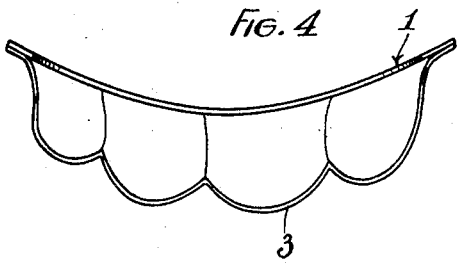
INVENTOR
CHARLES F. A. BELLAMY
BY
ATTORNEY Patented Apr. 15, 1924.

1,490,582

UNITED STATES PATENT OFFICE.

CHARLES F. A. BELLAMY, OF OAKLAND, CALIFORNIA.

GARDEN TOOL.

Application filed December 18, 1922. Serial No. 607,528.

*To all whom it may concern:*

Be it known that I, CHARLES F. A. BELLAMY, a subject of the King of Great Britain, residing at Oakland, in the county of Alameda and State of California, have invented certain new and useful Improvements in Garden Tools, of which the following is a specification.

My invention relates to improvements in garden tools, and more particularly to a form of planting trowel which is adapted to be engaged by the fingers of the user, leaving the thumb free.

The principal object of my invention is to provide an implement which is held on the fingers by frictional contact, allowing the hand to be used for other purposes without the necessity of each time picking up the trowel.

My device is particularly adapted for use in transplanting work, in which case it is generally worn on the right hand, the left hand being used to place the plant after a hole has been excavated by the use of my tool. The hand on which the tool is worn, may then be used for other purposes, such as trimming the plant or spreading out the roots, without the necessity of each time laying down and picking up the tool. Furthermore, I aim to provide a device which is simple and cheap, and which may be shaped from a single piece of sheet metal.

With these and other object in view, my invention comprises certain novel features of construction, combinations and arrangements of parts herein illustrated, and more particularly pointed out in the appended claim.

Referring to the drawing:

Figure 1 is a view in perspective of my improved tool showing the manner in which it is worn on the fingers.

Figure 2 is a view in plan showing the top part of the tool.

Figure 3 is a view in plan showing the bottom part of the tool.

Figure 4 is an end view of my invention.

Referring more particularly to the drawing, the numeral 1 indicates a ground working blade, which may be of any desired shape, but I have found it preferable to form it with a sharp point and slightly convex on top as shown. The rear end of the blade 1 is cut out as at 2 to better accommodate the hand when in a closed position.

A hand retaining cover plate 3 is formed on the rear of the blade 1 and is preferably formed to conform to the shape of the fingers of the hand.

In practice, the tool is placed on the hand and never removed during the planting or weeding operation, since it may be used equally well as a shovel, cultivator and rake. The plants may also be carried very conveniently in the concave side of the blade 1.

Having described by invention, I claim:

A garden tool comprising a convex, pointed blade, and a hand retaining cover plate formed on said blade, said cover plate conforming to the shape of the fingers.

In testimony whereof I affix my signature.

CHARLES F. A. BELLAMY.